RALPH E. ALDRICH
PAUL J. CARUSO
INVENTORS.

BY *Joseph S. Sandwich*

ATTORNEY.

United States Patent Office 3,564,560
Patented Feb. 16, 1971

3,564,560
RECORDING IN AN ELECTRO-OPTIC MEDIUM
Ralph Edward Aldrich, Arlington, and Paul John Caruso, Bedford, Mass., assignors to Itek Corporation, Lexington, Mass., a corporation of Delaware
Filed June 27, 1968, Ser. No. 740,709
Int. Cl. G01d 15/06; G11c 11/42
U.S. Cl. 346—74     12 Claims

ABSTRACT OF THE DISCLOSURE

A method and apparatus are disclosed for storing information supplied in the form of a radiation pattern by establishing an electro-static charge distribution across an electro-optic medium and a photoconductor medium to create, across the electro-optic medium, an electric field which varies as a function of radiation applied to the photoconductor medium, and results in corresponding variations in an electro-optic characteristic of the electro-optic medium.

CHARACTERIZATION OF INVENTION

The invention is characterized in a method of storing information supplied in the form of a radiation pattern in photoconductor apparatus for electro-optic readout comprising establishing a distributed electro-static charge across a photoconductor medium whose conductance varies in proportion to applied radiation and an electro-optic medium, exhibiting a characteristic which varies with variations in an applied electric field, associated with the photoconductor medium, to create an electric field across the electro-optic medium, and irradiating the photoconductor with a radiation pattern to vary the conductance of the photoconductor and the electric field across the electro-optic medium as a function of the intensity of the applied radiation pattern.

BACKGROUND OF INVENTION

This invention relates to a method and apparatus for storing radiation patterns of information, and more particularly to such a method and apparatus capable of electro-optic readout of information so stored.

Information in the form of radiant patterns or images may be stored in photoelectrets which are a class of semiconductor that exhibits a persistent internal polarization or electric field when exposed to radiation of the proper wavelength and an externally applied electric field. When so exposed the intensity of the internal field assumes a pattern which corresponds to, i.e. is a function of, the exposing pattern of radiation. Any one of various techniques may be used to read out the information stored by sensing the internal electric field.

The stored information may be read out by directly measuring the electrical fields. More recently electro-optic effects induced by the internal electric field have been used to read out the information, thereby avoiding certain problems involved in direct electrical readout operations.

Because the photoelectret effect is exhibited by a limited number of materials it is often difficult to select a material which functions efficiently as a photoelectret and optimizes certain other necessary or desirable features such as the ability for electro-optic readout.

SUMMARY OF INVENTION

Thus it is desirable to have available a new device for storing information presented in the form of radiation patterns.

It is also desirable to have available such a device in which the stored information may be retrieved by electro-optic readout.

It is also desirable to have available such a device using common photoconductor and electro-optic materials.

The invention may be accomplished by photoconductor storage apparatus for storing information supplied in the form of a radiation pattern for electro-optic readout including a photoconductor medium whose conductance varies in proportion to applied radiation. An electro-optic medium, exhibiting a characteristic which varies with variations of an applied electric field, is associated with the photoconductor medium. Means are provided for establishing, across the mediums, a distributed electro-static charge to create, across the electro-optic medium, an electric field that is variable as a function of a radiation information pattern applied to the photoconductor medium.

DISCLOSURE OF PREFERRED EMBODIMENT

Other objects, features and advantages will occur from the following description of a preferred embodiment and the accompanying drawings, in which.

A device for storing information according to this invention may be formed of an electro-optic layer and a photoconductor layer arranged with an interface between them and a grounded electrode adjacent the external face of the electro-optic layer. A corona discharge adjacent the external face sprays free ions onto the photoconductor and establishes a charge at that face and an opposite charge in the electrode adjacent the external face of the electro-optic layer. A pattern of radiation, such as produced by shining light through a transparency, is projected onto the device. The incident radiation produces free charges in the photoconductor layer; the number of free charges produced in a portion of the photoconductor layer is proportional to the intensity of the radiation incident on that portion. Free charges of opposite polarity to that of the ions produced on the face by the corona discharge are attracted to those ions and free charges of like polarity are repelled to the interface. Any charges of opposite polarity which reach the surface combine with ions and are neutralized. Those charges repelled toward the interface by the ions are prevented from reaching the electrode, which contains charges of opposite polarity, by a blocking layer. The blocking layer function may be assumed by the electro-optic medium. If the electro-optic medium and photoconductor medium are included in one material, the blocking layer may be a separate layer of dielectric material. An electric field is thus established across the electro-optic layer by the trapped charges at the interface, which field varies in direct correspondence with the pattern of incident radiation.

The characteristic or effect exhibited by the electro-optic layer is increased with increase in electric field intensity; for example, if the electro-optic layer exhibits birefringence the birefringence is increased with increase in applied field. The original radiation pattern is thus stored in the device and may be read out by sensing the variations in the intensity of the field through its influence on the birefringence of the device.

Figure 1:
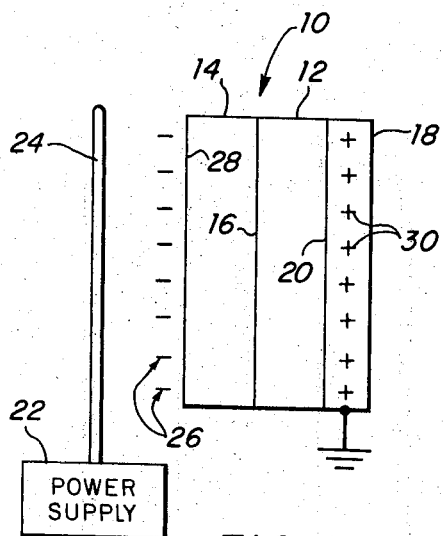
FIG. 1 is a diagrammatic side view of a storage device and charging arrangement according to this invention.

In FIG. 1 storage device 10 is formed of an electro-optic element 12 and a photoconductor element 14 combined in a layered arrangement having an interface 16. Electro-optic element 12 may be a material which exhibits electrically induced birefringence such as potassium dihydrogen phosphate (KDP) and photoconductor element 14 may be a material such as cadmium sulfide. An electrode 18 at external face 20 of element 12 is connected to a common point or ground relative to high voltage power supply 22. Lead 24 energized by power supply 22 produces a corona discharge which sprays charges 26 on external face 28. The negative charges 26 at face 28 cause positive charges 30 to accumulate at electrode 18 at face 20. The particular polarity assigned to the corona discharge and the charges established in the electrode in this embodiment is not a limitation of the invention. For the corona discharge may as well provide positive charges and the electrode accumulate negative charges.

Figure 2:
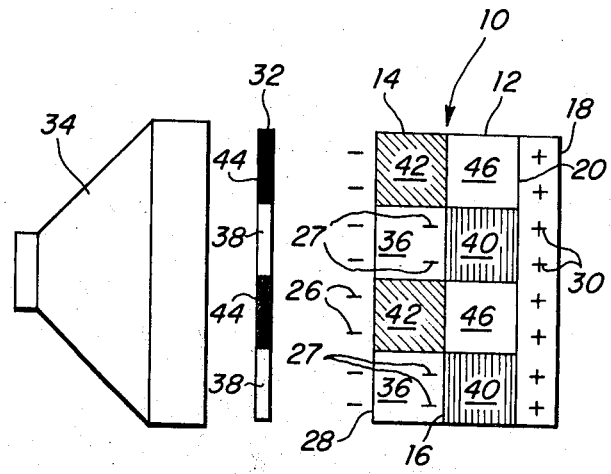
FIG. 2 is a diagrammatic side view showing a radiation pattern of information being stored in the device of FIG. 1.

In this state device 10 may be exposed through transparency 32, FIG. 2, to radiation from collimated radiation source 34. Many free charges are produced in sections 36 of element 14 struck by high intensity radiation through low density portions 38 of transparency 32 while fewer free charges are produced in sections 42 of element 14 struck by low intensity radiation through high density portions 44 of transparency 32. The free charges 27, produced in element 14, of the same, negative, polarity as the charges 26 deposited by the corona discharge, are repelled by charges 26 to the interface 16. The distribution of the free charges 27 which become trapped at interface 16 establishes an electric field across electro-optic element 12 which functions as a blocking layer. Since the charge separation across sections 40 is less than that across sections 46 the intensity of the electric field at sections 40 is greater than the intensity of the field at sections 46. The variations of the field intensity across electro-optic element 12 cause corresponding variations in the birefringence of that element which may be sensed by electro-optic techniques.

For example, the eccentricity of the elliptical field of radiation created by the relative phase shift of polarized radiation passing along the two different axes of the electro-optic birefringent material varies as a function of the field applied to element 12. Linearly polarized radiation applied to element 12 is transmitted as elliptically polarized radiation; the eccentricity of the elliptical field thus produced is a function of the birefringence of, therefore the intensity of, the electric field applied to the electro-optic element 12. An analyzer may be used to select a component of the elliptical field representative of the eccentricity of the field to create a positive reproduction of the image stored in device 10.

Charges 30 at face 20 and/or those of charges 26 remaining at face 28 may be removed by sweeping those faces with a grounded brush. The removal of these charges does no destroy the storage capability of the device: charges 27 at interface 16 are not removed by that action for they are effectively trapped and remain in the array established by the radiation pattern.

Figure 3:
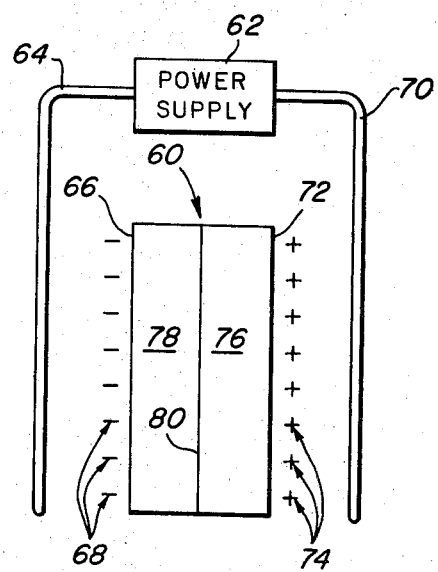
FIG. 3 is a diagrammatic side view of an alternate arrangement for charging a device according to this invention and an alternate storage device according to this invention.
Figure 4:
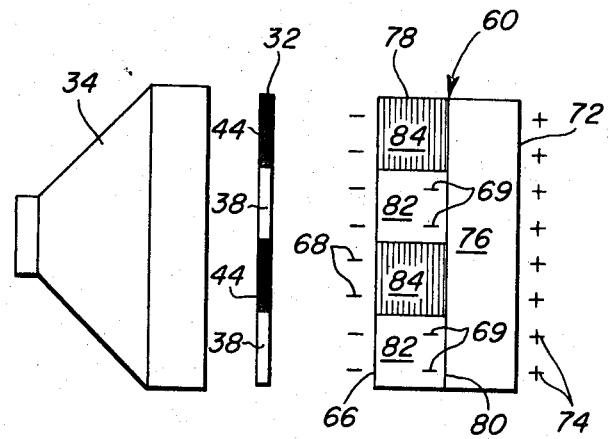
FIG. 4 is a diagrammatic side view showing a radiation pattern of information being stored in the device of FIG. 3.

Another arrangement for establishing an electrostatic charge distributed on a storage device 60, FIG. 3, according to this invention, employs two corona discharge devices. High voltage power supply 62 energizes lead 64 to produce a corona discharge which sprays face 66 of device 60 with negative charges 68 and energizes lead 70 to produce a corona discharge which sprays face 72 of device 60 with positive charges 74. With this technique an electrode is not required for accumulation of charges.

A further difference between the arrangements of FIG. 3 and FIG. 1 is that a dielectric element 76 and an electro-optic photoconductor element which exhibits both photoconductor and electro-optic characteristics, such as ZnTe, are combined with an interface 80 to form device 60. Dielectric element 76 performs the role of a blocking medium to separate the opposite polarity charges and aid in establishing a field. The element 76 may be formed of $SiO_2$. Irradiation of device 60 through transparency 32 by radiation source 34 produces many free charges in sections 82 of element 78 exposed through the low density portions 38 of transparency 32 and produces few free charges in sections 84 of element 78 exposed through the high density portions 44 of transparency 32.

The free charges 69, produced in element 78, of the same, negative, polarity as the charges 68 deposited by the corona discharge, are repelled by charges 68 to interface 80. With the negative charges 69 at interface 80 in sections 82 the electric field across these sections 82 is reduced, while the electric field across sections 84 where few or no charges 69 have migrated to interface 80 remains near the level created by the initial corona charge distribution. Since element 78 is an electro-optic medium as well as a photoconductor medium, an electro-optic characteristic of element 78 is varied as a function of the electric field across it. For example, if, as in FIGS. 1 and 2, the characteristic exhibited by the electro-optic medium is birefringence, the eccentricity of polarized radiation transmitted by device 60 will be lowest for radiation passing through sections 82 and highest for radiation passing through sections 84. An analyzer which selects a component of the transmitted radiation representative of the eccentricity of the elliptical field may be used to create a negative reproduction of the image stored in device 60.

In each of the arrangement shown either one or both faces may be charged provided that if only one face is charged means for accumulating charges of opposite polarity at the other face are employed. Either face may receive the positive charge. The exposure of the device may be made from either the photoconductor side of the device or from the other side.

The uniform charge distribution on the face or faces of the device may be provided by other than corona discharge methods. For example, the free charges or ions may be provided by an electron gun or cathode ray.

In cases where the information pattern to be stored is contained on a transparency or the like, collimated radiation should be used if the transparency is not in direct contact with the device.

Other embodiments will occur to those skilled in the art and are within the following claims.

What is claimed is:

1. Storage apparatus for storing information supplied in the form of a radiation pattern for electro-optic readout, comprising:
   a photoconductor medium whose conductance varies in proportion to applied radiation;
   an electro-optic medium, exhibiting a characteristic which varies with variations of an applied electric field, said photoconductor medium being included in a first material formed as a first element and said electro-optic medium being included in a second material formed as a second element, and said elements having an interface; and,
   means for establishing, across said mediums a distributed electro-static charge to create, across said electro-optic medium, an electric field that is variable as a function of a radiation information pattern applied to said photoconductor medium.

2. An apparatus of claim 1 in which said means for establishing a distributed electro-static charge comprises a series circuit including a source of charges adjacent one of said elements and an electrode contacting the other of said elements.

3. An apparatus of claim 1 in which said means for establishing a distributed electrical charge includes a source of free charges of a first polarity adjacent one of said elements and a source of free charges of the opposite polarity adjacent the other of said elements.

4. An apparatus of claim 3 in which said electro-optic medium exhibits birefringence in proportion to the strength of the electric field thereacross.

5. An apparatus of claim 4 in which said means for establishing a distributed electro-static charge includes an electro-static discharge device.

6. An apparatus of claim 5 in which said electro-static discharge device includes a corona discharge member.

7. An apparatus of claim 6 in which the electric field across said electro-optic medium varies in direct proportion to the intensity of the applied radiation.

8. Storage apparatus for storing information supplied in the form of a radiation pattern for electro-optic readout, comprising:
 a photoconductor medium whose conductance varies in proportion to applied radiation;
 an electro-optic medium, exhibiting a characteristic which varies with the variations of an applied electric field, said photoconductor medium and said electro-optic medium being included in a single material formed as a single element that exhibits both effects; and,
 means for establishing, across said mediums, a distributed electro-static charge to create, across said electro-optic medium, an electric field that is variable as a function of a radiation information pattern applied to said photoconductor medium.

9. An apparatus of claim 8 in which said means for establishing includes a dielectric element having an interface with said single element.

10. An apparatus of claim 9 in which said means for establishing a distributed electro-static charge comprises a series circuit including a source of charges adjacent either said single element or said dielectric element and an electrode contacting the other of said elements.

11. An apparatus of claim 9 in which said means for establishing further includes a source of free charges of a first polarity adjacent either said single element or said dielectric element and a source of free charges of the opposite polarity adjacent the other of said elements.

12. An apparatus of claim 9 which the electric field across said combination element varies in inverse proportion to the intensity of the applied radiation.

References Cited
UNITED STATES PATENTS

| | | | |
|---|---|---|---|
| 3,322,538 | 5/1967 | Redington | 346—74X |
| 3,407,394 | 10/1968 | Hartke | 340—173 |
| 3,479,651 | 11/1969 | Bowers | 340—173 |

BERNARD KONICK, Primary Examiner

G. M. HOFFMAN, Assistant Examiner

U.S. Cl. X.R.

340—173